US 10,083,439 B2

(12) United States Patent
Turgeman et al.

(10) Patent No.: US 10,083,439 B2
(45) Date of Patent: Sep. 25, 2018

(54) DEVICE, SYSTEM, AND METHOD OF DIFFERENTIATING OVER MULTIPLE ACCOUNTS BETWEEN LEGITIMATE USER AND CYBER-ATTACKER

(71) Applicant: BioCatch Ltd., Tel Aviv (IL)

(72) Inventors: Avi Turgeman, Cambridge, MA (US); Oren Kedem, Tel Aviv (IL)

(73) Assignee: BIOCATCH LTD., Tel Aviv (IL)

( * ) Notice: Subject to any disclaimer, the term of this patent is extended or adjusted under 35 U.S.C. 154(b) by 193 days.

(21) Appl. No.: 15/193,057

(22) Filed: Jun. 26, 2016

(65) Prior Publication Data

US 2016/0307191 A1 Oct. 20, 2016

Related U.S. Application Data

(63) Continuation-in-part of application No. 14/325,398, filed on Jul. 8, 2014, now Pat. No. 9,477,826, and a
(Continued)

(51) Int. Cl.
*G06Q 20/38* (2012.01)
*G06Q 20/40* (2012.01)
(Continued)

(52) U.S. Cl.
CPC ......... *G06Q 20/382* (2013.01); *G06F 21/316* (2013.01); *G06Q 20/40* (2013.01);
(Continued)

(58) Field of Classification Search
CPC ..... G06Q 20/382; G06F 21/316; G06F 21/40; H04L 63/08; H04L 63/1441
See application file for complete search history.

(56) References Cited

U.S. PATENT DOCUMENTS 3,618,019 A 11/1971 Nemirovsky et al.
3,699,517 A 10/1972 Dyche
(Continued)

FOREIGN PATENT DOCUMENTS

EP 2410450 1/2012
EP 2477136 7/2012
(Continued)

OTHER PUBLICATIONS

Ahmed et al., "A New Biometric Technology Based on Mouse Dynamics", Jul.-Sep. 2007, IEEE Transactions on Dependable and Secure Computing, vol. 4, No. 3, pp. 165-179.
(Continued)

*Primary Examiner* — Kambiz Zand
*Assistant Examiner* — Tongoc Tran
(74) *Attorney, Agent, or Firm* — Eitan, Mehulal & Sadot

(57) ABSTRACT

Devices, systems, and methods of user authentication, as well as automatic differentiation between a legitimate user and a cyber-attacker. A system detects that two different accounts of the same computerized service, were accessed by a single computing device over a short period of time. The system may employ various techniques in order to determine automatically whether a legitimate user accessed the two different account, such as, a husband accessing his own bank account and shortly after that accessing also his wife's bank account, or a payroll company accessing bank accounts of two clients for payroll management purposes. Conversely, the system is able to detect that the same user exhibited the same pattern of interactions when operating the two accounts, a pattern of interactions that does not frequently appear in the general population of legitimate users, thereby indicating that the single user is a cyber-attacker.

33 Claims, 2 Drawing Sheets

Related U.S. Application Data continuation-in-part of application No. 14/320,656, filed on Jul. 1, 2014, now Pat. No. 9,665,703, and a continuation-in-part of application No. 14/325,396, filed on Jul. 8, 2014, which is a continuation-in-part of application No. 13/922,271, filed on Jun. 20, 2013, now Pat. No. 8,938,787, and a continuation-in-part of application No. 13/877,676, filed as application No. PCT/IL2011/000907 on Nov. 29, 2011, now Pat. No. 9,069,942.

(60) Provisional application No. 62/190,264, filed on Jul. 9, 2015, provisional application No. 61/843,915, filed on Jul. 9, 2013, provisional application No. 61/417,479, filed on Nov. 29, 2010.

(51) Int. Cl.
  *G06F 21/31* (2013.01)
  *H04L 29/06* (2006.01)

(52) U.S. Cl.
  CPC .......... *H04L 63/08* (2013.01); *H04L 63/1441* (2013.01); *G06F 2221/2133* (2013.01); *H04L 2463/082* (2013.01); *H04L 2463/144* (2013.01)

(56) References Cited

U.S. PATENT DOCUMENTS

| | | |
|---|---|---|
| 3,983,535 A | 9/1976 | Herbst et al. |
| 4,128,829 A | 12/1978 | Herbst et al. |
| 4,621,334 A | 11/1986 | Garcia |
| 4,760,386 A | 7/1988 | Heath et al. |
| 4,805,222 A | 2/1989 | Young et al. |
| 5,485,171 A | 1/1996 | Copper et al. |
| 5,557,686 A | 9/1996 | Brown et al. |
| 5,838,306 A | 11/1998 | O'Connor et al. |
| 5,874,941 A | 2/1999 | Yamada |
| 6,337,686 B2 | 1/2002 | Wong et al. |
| 6,337,919 B1 | 1/2002 | Dunton |
| 6,572,014 B1 | 6/2003 | Lambert |
| 6,819,219 B1 | 11/2004 | Bolle |
| 6,938,061 B1 | 8/2005 | Rumynin et al. |
| 6,938,159 B1 | 8/2005 | O'Connor et al. |
| 6,957,185 B1 | 10/2005 | Labaton |
| 6,957,186 B1 | 10/2005 | Guheen et al. |
| 6,983,061 B2 | 1/2006 | Ikegami et al. |
| 7,130,452 B2 | 10/2006 | Bolle et al. |
| 7,133,792 B2 | 11/2006 | Murakami et al. |
| 7,139,916 B2 | 11/2006 | Billingsley et al. |
| 7,245,218 B2 | 7/2007 | Ikehara et al. |
| 7,494,061 B2 | 2/2009 | Reinhold |
| 7,523,191 B1 | 4/2009 | Thomas et al. |
| 7,606,915 B1 | 10/2009 | Calinov et al. |
| 7,796,013 B2 | 9/2010 | Murakami et al. |
| 7,818,290 B2 | 10/2010 | Davis et al. |
| 8,417,960 B2 | 4/2013 | Takahashi et al. |
| 8,433,785 B2 | 4/2013 | Awadallah et al. |
| 8,510,113 B1 | 8/2013 | Conkie et al. |
| 8,548,208 B2 | 10/2013 | Schultz |
| 9,154,534 B1 | 10/2015 | Gayles et al. |
| 9,174,123 B2 | 11/2015 | Nasiri et al. |
| 9,282,112 B2 | 3/2016 | Filatov |
| 9,301,140 B1 | 3/2016 | Costigan et al. |
| 9,304,915 B2 | 4/2016 | Adams et al. |
| 2001/0004733 A1 | 6/2001 | Eldering |
| 2002/0023229 A1* | 2/2002 | Hangai .................. G06F 21/32 726/21 |
| 2002/0089412 A1 | 7/2002 | Heger et al. |
| 2003/0033526 A1 | 2/2003 | French et al. |
| 2003/0074201 A1 | 4/2003 | Grashey et al. |
| 2003/0212811 A1 | 11/2003 | Thornton |
| 2004/0015714 A1 | 1/2004 | Abraham et al. |
| 2004/0062423 A1 | 4/2004 | Doi |
| 2004/0111523 A1 | 6/2004 | Hall et al. |
| 2005/0008148 A1 | 1/2005 | Jacobson |
| 2005/0179657 A1 | 8/2005 | Russo et al. |
| 2005/0289264 A1 | 12/2005 | Illowsky et al. |
| 2006/0006803 A1 | 1/2006 | Huang et al. |
| 2006/0143454 A1 | 6/2006 | Walmsley |
| 2006/0195328 A1 | 8/2006 | Abraham et al. |
| 2006/0215886 A1 | 9/2006 | Black |
| 2006/0224898 A1 | 10/2006 | Ahmed |
| 2006/0282660 A1 | 12/2006 | Varghese et al. |
| 2006/0284969 A1 | 12/2006 | Kim et al. |
| 2007/0156443 A1* | 7/2007 | Gurvey .................. G06Q 10/02 705/64 |
| 2007/0174082 A1* | 7/2007 | Singh .................... G06Q 20/20 705/44 |
| 2007/0183633 A1 | 8/2007 | Hoffmann |
| 2007/0214426 A1 | 9/2007 | Ruelle et al. |
| 2007/0255821 A1 | 11/2007 | Ge et al. |
| 2007/0266305 A1 | 11/2007 | Cong et al. |
| 2007/0271466 A1 | 11/2007 | Mak et al. |
| 2007/0283416 A1 | 12/2007 | Renaud |
| 2008/0084972 A1* | 4/2008 | Burke .................. G06Q 10/107 379/88.02 |
| 2008/0091639 A1 | 4/2008 | Davis et al. |
| 2008/0092209 A1 | 4/2008 | Davis et al. |
| 2008/0097851 A1* | 4/2008 | Bemmel ................ G06Q 30/02 705/14.36 |
| 2008/0162449 A1 | 7/2008 | Chao-Yu et al. |
| 2008/0183745 A1 | 7/2008 | Cancel et al. |
| 2008/0211766 A1 | 9/2008 | Westerman et al. |
| 2008/0215576 A1 | 9/2008 | Zhao et al. |
| 2008/0301808 A1 | 12/2008 | Calo et al. |
| 2009/0089879 A1 | 4/2009 | Wang et al. |
| 2009/0094311 A1 | 4/2009 | Awadallah et al. |
| 2009/0132395 A1* | 5/2009 | Lam .................. G06F 17/30699 705/30 |
| 2009/0157792 A1* | 6/2009 | Fiatal .................. G06Q 30/04 709/201 |
| 2009/0189736 A1 | 7/2009 | Hayashi |
| 2009/0199296 A1 | 8/2009 | Xie et al. |
| 2009/0254336 A1 | 10/2009 | Dumais et al. |
| 2009/0293119 A1 | 11/2009 | Jonsson |
| 2009/0320123 A1 | 12/2009 | Yu et al. |
| 2010/0042403 A1 | 2/2010 | Chandrasekar et al. |
| 2010/0046806 A1 | 2/2010 | Baughman et al. |
| 2010/0070405 A1* | 3/2010 | Joa .......................... G06Q 20/10 705/38 |
| 2010/0077470 A1 | 3/2010 | Kozat et al. |
| 2010/0082747 A1 | 4/2010 | Yue et al. |
| 2010/0082998 A1 | 4/2010 | Kohavi |
| 2010/0122082 A1 | 5/2010 | Deng et al. |
| 2010/0125816 A1 | 5/2010 | Bezos |
| 2010/0281539 A1 | 11/2010 | Burns et al. |
| 2010/0328074 A1 | 12/2010 | Johnson et al. |
| 2011/0012829 A1 | 1/2011 | Yao |
| 2011/0016320 A1 | 1/2011 | Bergsten et al. |
| 2011/0023115 A1 | 1/2011 | Wright |
| 2011/0029902 A1 | 2/2011 | Bailey |
| 2011/0039602 A1* | 2/2011 | McNamara ............ G06F 3/017 455/566 |
| 2011/0063211 A1 | 3/2011 | Hoerl et al. |
| 2011/0065504 A1 | 3/2011 | Dugan et al. |
| 2011/0102570 A1 | 5/2011 | Wilf et al. |
| 2011/0113388 A1 | 5/2011 | Eisen et al. |
| 2011/0154273 A1 | 6/2011 | Aburada et al. |
| 2011/0159650 A1* | 6/2011 | Shiraishi .............. H01L 29/0856 438/269 |
| 2011/0159850 A1* | 6/2011 | Faith .................. G06Q 30/0201 455/411 |
| 2011/0162076 A1 | 6/2011 | Song et al. |
| 2011/0191820 A1 | 8/2011 | Ivey |
| 2011/0193737 A1 | 8/2011 | Chiueh |
| 2011/0202453 A1 | 8/2011 | Issa et al. |
| 2011/0246902 A1 | 10/2011 | Tsai et al. |
| 2011/0251823 A1 | 10/2011 | Davis et al. |
| 2011/0271342 A1 | 11/2011 | Chung et al. |
| 2011/0276414 A1 | 11/2011 | Subbarao et al. |
| 2012/0005483 A1 | 1/2012 | Patvarczki et al. |
| 2012/0054834 A1 | 3/2012 | King |

(56) References Cited

U.S. PATENT DOCUMENTS

| | | |
|---|---|---|
| 2012/0096555 A1 | 4/2012 | Mahaffey |
| 2012/0133055 A1 | 5/2012 | Machida |
| 2012/0154173 A1 | 6/2012 | Chang et al. |
| 2012/0154273 A1 | 6/2012 | Mcdade et al. |
| 2012/0154823 A1 | 6/2012 | Sakamoto |
| 2012/0167170 A1 | 6/2012 | Shi |
| 2012/0218193 A1 | 8/2012 | Weber et al. |
| 2012/0278804 A1 | 11/2012 | Narayanasamy et al. |
| 2013/0036416 A1 | 2/2013 | Raju et al. |
| 2013/0097682 A1 | 4/2013 | Zeljkovic et al. |
| 2013/0097706 A1 | 4/2013 | Titonis et al. |
| 2013/0111586 A1 | 5/2013 | Jackson |
| 2013/0133055 A1 | 5/2013 | Ali et al. |
| 2013/0135218 A1 | 5/2013 | Jain |
| 2013/0154999 A1 | 6/2013 | Guard |
| 2013/0167212 A1 | 6/2013 | Azar et al. |
| 2013/0305357 A1 | 11/2013 | Ayyagari et al. |
| 2014/0033317 A1 | 1/2014 | Barber |
| 2014/0078061 A1 | 3/2014 | Simons et al. |
| 2014/0078193 A1 | 3/2014 | Barnhoefer et al. |
| 2014/0082369 A1 | 3/2014 | Waclawsky et al. |
| 2014/0143304 A1 | 5/2014 | Hegarty et al. |
| 2014/0196119 A1 | 7/2014 | Hill et al. |
| 2014/0200953 A1 | 7/2014 | Mun |
| 2014/0250538 A1 | 9/2014 | Rapaport et al. |
| 2014/0259130 A1 | 9/2014 | Li et al. |
| 2014/0283059 A1 | 9/2014 | Sambamurthy et al. |
| 2014/0317734 A1 | 10/2014 | Valencia et al. |
| 2014/0344927 A1 | 11/2014 | Turgeman et al. |
| 2015/0012920 A1 | 1/2015 | De Santis et al. |
| 2015/0101031 A1 | 4/2015 | Harjanto et al. |
| 2016/0006800 A1 | 1/2016 | Summers et al. |
| 2016/0042164 A1 | 2/2016 | Goldsmith et al. |
| 2016/0164905 A1 | 6/2016 | Pinney Wood et al. |
| 2016/0164906 A1 | 6/2016 | Pinney Wood et al. |
| 2017/0048272 A1 | 2/2017 | Yamamura et al. |

FOREIGN PATENT DOCUMENTS

| | | |
|---|---|---|
| EP | 2610776 | 7/2013 |
| WO | 2007146437 | 12/2007 |
| WO | 2012073233 | 6/2012 |

OTHER PUBLICATIONS

Bailey, Kyle O., "Computer Based Behavioral Biometric Authentication Via Multi-Modal Fusion", Thesis, 2013, Air Force Insitute of Technology.

Stinson et al., "Characterizing Bots' Remote Control Behavior". Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

Franklin et al., "Remote Detection of Virtual Machine Monitors with Fuzzy benchmarking", ACM SIGOPS Operating Systems Review, V42, Issue 3, Apr. 2008.

Georgia Frantzeskou et al., "Identifying Authorship by Byte-Level N-Grams: The source Code Author Profile (SCAP) Method", Spring 2007, International Journal of Digital Evidence, vol. 6, issue 1.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Zheng et al., "An Efficient User Verification System via Mouse Movements", Oct. 17-21, 2011, CCS' 11, Chicago, Illinois.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Spafford et al., "Software Forensics: Can We Track Code to its Authors?", Feb. 1992, Computer Science Technical Report, Purdue e-Pubs, Report No. CSD-TR-92-010.

Garfinkel and Rosenblum, "A virtual Machine Introspection-Based Architecture for Intrusion Detection.", 2003, Proc. Network and Distributed Systems Security Symp., The Internet Society, pp. 191-206.

Nance et al., "Virtual Machine Introspection", IEEE Security & Privacy, 2008.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

International Search Report for application PCT/IL2011/000907 dated Apr. 19, 2012.

International Search Report for application PCT/IB2014/062293 dated Oct. 1, 2014.

International Search Report for application PCT/IB2014/062941 dated Dec. 17, 2014.

International Search Report for application PCT/IB2016/054064 dated Nov. 21, 2016.

* cited by examiner

DEVICE, SYSTEM, AND METHOD OF DIFFERENTIATING OVER MULTIPLE ACCOUNTS BETWEEN LEGITIMATE USER AND CYBER-ATTACKER

CROSS-REFERENCE TO RELATED APPLICATIONS

This application claims priority and benefit from U.S. provisional patent application No. 62/190,264, filed on Jul. 9, 2015, which is hereby incorporated by reference in its entirety.

This application is a Continuation-in-Part (CIP) of U.S. patent application Ser. No. 14/325,398, filed on Jul. 8, 2014, which is hereby incorporated by reference in its entirety.

This application is a Continuation-in-Part (CIP) of U.S. patent application Ser. No. 14/320,656, filed on Jul. 1, 2014, which is hereby incorporated by reference in its entirety.

This application is a Continuation-in-Part (CIP) of U.S. patent application Ser. No. 14/325,396, filed on Jul. 8, 2014, which is hereby incorporated by reference in its entirety.

The above-mentioned U.S. patent application Ser. No. 14/325,396 claims priority and benefit from U.S. provisional patent application No. 61/843,915, filed on Jul. 9, 2013, which is hereby incorporated by reference in its entirety.

The above-mentioned U.S. patent application Ser. No. 14/325,396 is a Continuation-in-Part (CIP) of U.S. patent application Ser. No. 13/922,271, filed on Jun. 20, 2013, now U.S. Pat. No. 8,938,787, which is hereby incorporated by reference in its entirety.

The above-mentioned U.S. patent application Ser. No. 14/325,396 is a Continuation-in-Part (CIP) of U.S. patent application Ser. No. 13/877,676, filed on Apr. 4, 2013, now U.S. Pat. No. 9,069,942; which is a National Phase filing of PCT International Application number PCT/IL2011/000907, filed on Nov. 29, 2011, published as International Publication number WO/2012/073233; which claims priority and benefit from U.S. provisional patent application No. 61/417,479, filed on Nov. 29, 2010; and all the above-mentioned patent applications are hereby incorporated by reference in their entirety.

FIELD

The present invention is related to the field of security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for differentiating or distinguishing between: (i) a legitimate user that accesses and/or utilizes (or that attempts to access or to utilize) multiple different accounts of a computerized service; and (ii) an illegitimate or fraudulent user or attacker or cyber-attacker, who accesses and/or utilizes (or that attempts to access or to utilize) multiple different accounts of a computerized service; even if such multiple access sessions or such multiple attempts, are performed from the same, single, computer or electronic device, and/or from the same, single, originating Internet Protocol (IP) address.

The present invention may provide other and/or additional benefits or advantages.

DETAILED DESCRIPTION OF THE PRESENT INVENTION

Figure 1:
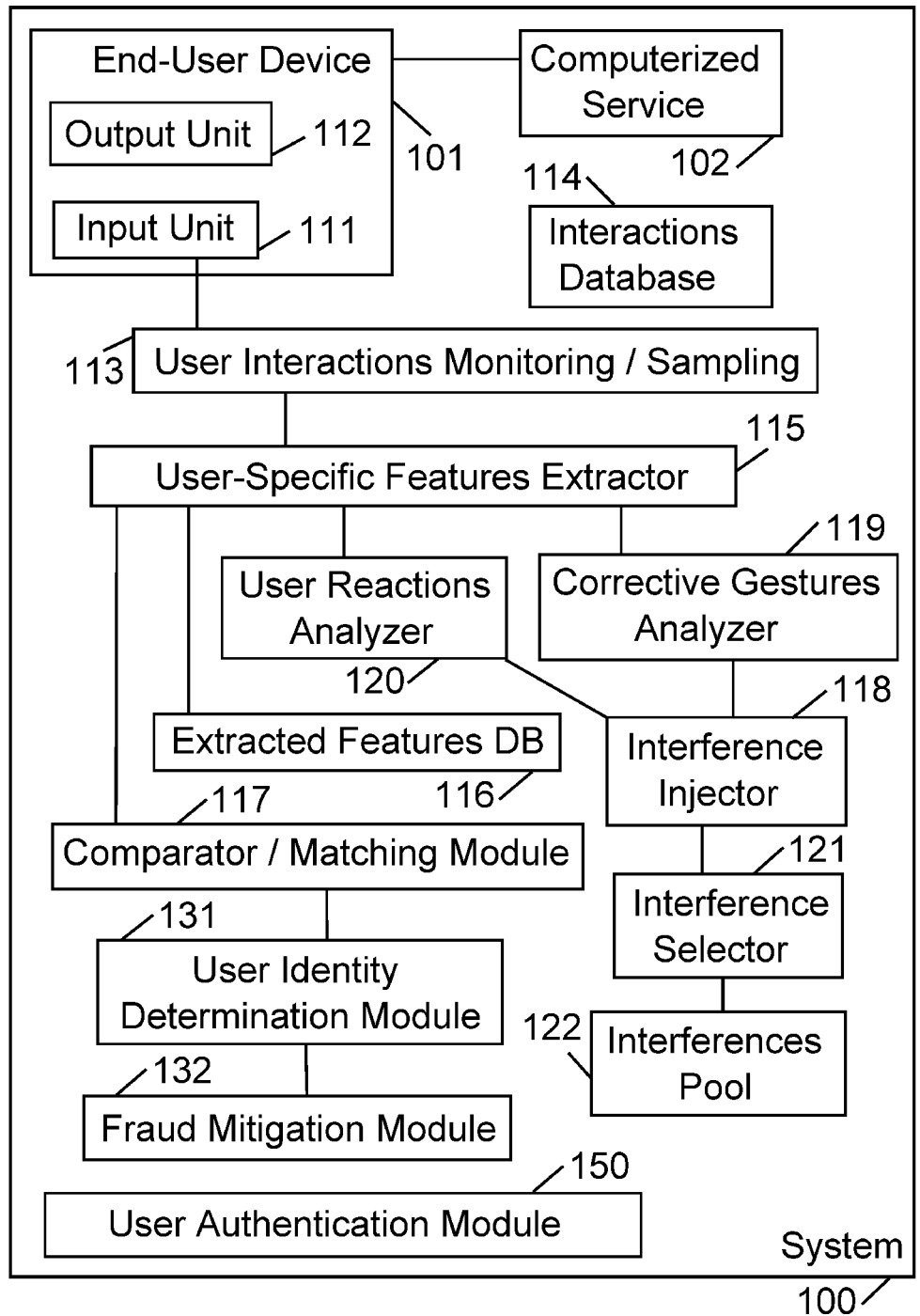
FIG. 1 is a schematic block-diagram illustration of a system, in accordance with some demonstrative embodiments of the present invention.

Some embodiments of the present invention may comprise classification or determination of properties with regard to users and/or accounts, enabling automatic or automated distinguishing between (i) a legitimate user that legitimately accesses multiple, different, accounts, and (ii) a cyber-attacker or other illegitimate user who tries to fraudulently access multiple, different, user accounts.

The Applicants have realized that some attackers or fraudsters or cyber-attacker utilize (or attempt to utilize; or access; or attempt to access) multiple online accounts over a short period of time from the same computer or device; for example, a bank cyber-attacker may attempt to access ten different bank accounts of ten different victims, at the same banking website, within one hour; for example, by trying to utilize a set of stolen pairs or username/password strings, by using the same computer, from the same Internet Protocol (IP) address.

However, the Applicants have also realized that some legitimate users (genuine users, authorized users, non-attackers) may similarly access or utilize multiple online accounts over a short period of time from the same computer or from the same device, from the same IP address. Such legitimate users of multiple different account may be, for example: a person managing multiple accounts for family members (e.g., for himself, for his spouse, for his child, for his parent); an organ (e.g., executive, manager, director) in a corporation or company or other organization that manages multiple accounts (e.g., for the company, for a subsidiary, for an affiliated company, for a related company); a head of household; a financial consultant; a financial broker or money-manager; a bookkeeper or accountant; a payroll service provider; an attorney or trustee; a person operating on behalf of custodian(s) or beneficiaries; or the like.

In accordance with the present invention, a computerized system may generate and/or utilize one or more indicators in order to identify or cluster or group-together multiple such online accounts, that are legitimately accessed or utilized by the same user; thereby determining that even though the same user accesses multiple accounts over a short period of time, a determination can be made that such user is not necessarily an attacker but rather is a legitimate multiple-accounts user.

The system may utilize an Account Clustering module, to perform such clustering of accounts based on one or more characteristics; for example, clustering together multiple accounts of a household or a family, based on the last name (family name) of the users involved or the accounts involved or the account-owners involved, or based on a common household address or mailing address or customer address, or based on external data (e.g., data from third party databases indicating that Person A is family-related to Person B); or clustering together multiple accounts of a corporate enterprise (e.g., based on corporate names similarity, such as, detecting that the accounts are owned by "T-Rex Industries" and "T-Rex Holdings" and "T-Rex Technology and "T-Rex Capital" or other similar or partially-overlapping names; or based on third-party data that indicates corporate relation or affiliation among certain corporations); or clustering together multiple accounts based on identification or indicators that one or some or all of them relate to Custodians or Beneficiaries (e.g., if the account names include the word "Trust" or "Estate" or "UTMA" or "Universal Transfer to Minors Act", or other suitable string).

The system may utilize link analysis (of a devices from which multiple accounts are accessed) to detect such incidents and to avoid "false positive" errors (or a mistaken fraud-alert), by identifying "genuine" use cases that generate the same or similar characteristics. The system may identify accounts or cluster-of-accounts that may be inter-linked or inter-related, based on the above-mentioned data and/or based on other information (e.g., based on behavioral profiles, based on previous device linkage data or account linkage data).

Additionally or alternatively, the system may take into account, or may utilize a "different users utilizing same device" detection module, in order to determine that even though multiple accounts were accessed from the same computing device, multiple (two or more) users were operating those accounts, rather than a single (e.g., possibly fraudulent) user. Such differentiation may utilize one or more behavioral characteristics (e.g., a unique user-specific behavior of operating an input-unit, of interacting with a User Interface of a service or application, of responding to an input/output interference), and such differentiation may contribute to a determination that multiple accounts belong to a common cluster, and therefore the multiple access to those multiple accounts (performed from a single device) may be legitimate and non-fraudulent.

In accordance with some embodiments of the present invention, the system may perform clustering or classification of multiple accounts that were accessed over a short period of time (e.g., shorter than a pre-defined threshold value), and that are non-related or non-interlinked, based on similar user-behavior in such multiple, different, accounts.

The Applicants have realized that in some situations, an attacker gains a list of credentials (e.g., a long list of pairs of username/password strings) that relate to a particular website or service (e.g., a particular online retailer, or a particular e-commerce/online store, or a particular banking website); and the attacker then attempts to access such accounts one-by-one, optionally utilizing spoofing mechanisms that hide or fake or modify location information and/or device-fingerprint information and/or originating IP address.

The Applicants have also realized that such multiple accesses by an attacker, may still exhibit identical or similar operations or transactions or interactions, that the attacker performs within each one of the accessed account, over a short period of time (e.g., five or ten minutes, or one hour); and such consistent cross-account behavior may, sometimes, be abnormal behavior that does not correspond to the general behavior of legitimate users or the general population of users (e.g., of that particular website or service).

Accordingly, the system may comprise a Cross-Account Similar-Behavior Clustering module, which may analyze the behavior or interactions that were performed or exhibited over a short period of time (e.g., within a ten-minute time-slot, or within a one-hour time-slot); and may detect the same (or highly similar) behavior, optionally abnormal behavior, over a group or cluster of such accounts or usage-sessions. Even though the attacker is using multiple stolen identities to access multiple accounts, he may still exhibit the same (or similar, beyond a threshold value of similarity) behavior or interaction-pattern, which may be observed by the system's monitoring modules. By analyzing usage-session that took place within short time intervals (e.g., one hour, or two hours, or five hours), the system may identify behavior that exhibits frequency that is beyond what is normally expected (or normally observed) in normal distribution of usage sessions (namely, when users of the general population access that site at random). The analysis may thus detect a cluster of usage-sessions that appear to belong to the same user, who utilized different credential to access multiple different accounts over a short period of time; thereby enabling the system to trigger a possible-fraud notification with regard to those accounts or usage-sessions.

Reference is made to FIG. 1, which is a schematic block-diagram illustration of a system 100 in accordance with some demonstrative embodiments of the present invention. The components of system 100 may be implemented by using suitable hardware units and/or software units; and may be co-located within a single computer device or a single computing system, or may be scattered or distributed across two or more computing devices and/or computing systems. In some embodiments, client-server architecture may be used; such that some of the components and units may be implemented locally at the end-user device, whereas other components and units may be implemented remotely or by using a remote server or a "cloud computing" server or repository or computer. In some embodiments, some modules and functionality may be implemented by utilizing a web-browser, a plug-in or extension or add-on to a web-browser or to an Operating System (OS), by using a native application or a mobile-web application, by using JavaScript and/or CSS and/or HTML5, and/or by using other suitable technologies. Components of system 100 may interact or communicate over one or more wireless communication links, wired communication links, cellular communication, client/server communication, peer-to-peer communication, or the like.

System 100 may enable an end-user device 101 to interact with a computerized service 102. The end-user device 101 may be, for example, a smartphone, a tablet, a laptop computer, a fitness bracelet (e.g., similar to FitBit® or JawBone® wearable devices), a wearable device, a portable device, an Augmented Reality (AR) device or glasses or helmet or headgear (e.g., similar to Google Glass®), a Virtual Reality (VR) device or glasses or helmet or headgear (e.g., similar to Oculus Rift®), or the like. In some embodiments, the end-use device 101 may be a stand-alone machine or interface; a digital kiosk or kiosk-type machine, a vending machine, an Automated Teller Machine (ATM), a point-of-sale (POS) terminal or machine, or the like. In some embodiments, the end-user device 101 may be a point-of-entry terminal, or a user-identification terminal, such as a terminal or scanner or dashboard or touch-screen which may be used for secure physical entry or entrance or passage through a gate or door or lobby or turnstiles or room or corridor, or as part of (or replacement of) a physical entry monitoring system. In yet other embodiments, the end-user device 101 may be or may comprise, or may be comprised in, a vehicle, a vehicular device, a dashboard, a vehicular dashboard, a vehicular computing system, a vehicular computing device, a vehicular ignition unit or system, a vehicular component that is operable in conjunction with a vehicular ignition system, a vehicular immobilizer unit, a vehicular component that is operable in conjunction with a vehicular immobilizer unit, or the like.

The computerized service 102 may be a local and/or a remote computerized platform or service or application or web-site or web-page. The computerized service may be installed locally and entirely on the end-user device 101; or may be installed remotely and entirely on a remote server or a remote computer which is then accessed by the end-user device 101 either via one or more wired and/or wireless communication link(s); or may be a hybrid implementation which utilizes one or more remote components (e.g., a remote Application Server) and one or more local components (e.g., a local native application; a local mobile-web application; a local web-browser).

Some demonstrative and non-limiting examples, of suitable computerizes service(s) which may be used in conjunction with the present invention, may include: banking service, online banking services, retail banking services (e.g., performed within or at an ATM or a branch of a bank); brokerage or online brokerage services; usage and/or access to electronic mail, email, SMS accounts, instant messaging (IM) accounts and services, social networks; an enterprise network or corporate network or organizational network which is available only to employees or authorized users of an organization or enterprise; a members-only network or service, or a paying-members-only service or network, or a premium service, which are available only to certain users and/or to members and/or to paying users; applications and/or websites and/or services that enable or perform payment, electronic payment, utilization of credit card and/or debit card and/or wire transfer and/or electronic funds transfer; applications that access or utilize a secure database storing confidential or non-public information; and/or any suitable electronic service which may be accessed locally and/or remotely by end-user device 101.

In some embodiments, the computerized service 102 need not be external to the end-user device 101, and may be entirely internal to the end-user device 101, or may be the end-user device 101, or may be a particular functionality or a general functionality of the end-user device 101. For example, the end-user device may be a smartphone or tablet; and the computerized service 102 may be one or more features or functionalities or applications of that smartphone or tablets. In some embodiments, the present invention may be used as part of a locking or unlocking mechanism of a smartphone or tablet or other end-user device 101; or as part of a process in which a user unlocks or "wakes up" a hibernating device, or takes the device from reduced-power mode (or from "sleep mode") to fully-operational mode.

End-user device comprises an input unit 111, for example, mouse, keyboard, stylus, touch-screen, multi-touch-screen, trackball, joystick, or the like. End-user device further comprises an output unit 112, for example, monitor, screen, touch-screen, multi-touch-screen, or the like. In some embodiments, the input unit and the output unit may be implemented as the same single unit, for example, as a touch-screen or multi-touch screen.

A user interactions monitoring/sampling module 113 may monitor some or all of the user interactions and/or user gestures; and may record, capture, or otherwise sample such interactions and/or gestures. Optionally, an interactions database 114 may log and/or may store data reflecting the monitored user interactions, for a single user or for multiple users.

User-specific features extractor 115 may extract or estimate user-specific features or traits or characteristics or attributes, that characterize an interaction (or a set or batch or group or flow of interactions, or a session of interactions) of a user with the computerized service 102. Optionally, an extracted features database 116 may store data or records which reflects users and their respective values of extracted (or estimated) user-specific features.

Optionally, a comparator/matching module 117 may compare or match, between (or among): (a) values of user-specific features that are extracted in a current user session (or user interaction), and (b) values of respective previously-captured or previously-extracted user-specific features (of the current user, and/or of other users, and/or of pre-defined sets of values that correspond to known automated scripts or "bots" or known attackers).

The user-specific features, whose values may be compared or matched across usage-sessions, may include, for example, curvature (or curvature radius) of mouse movement or mouse strokes; acceleration and/or speed of mouse movement in one or more directions; smoothness of movement; velocity or speed of gestures; acceleration or deceleration of gestures; rate or frequency of mouse clicks; accuracy or inaccuracy of gestures or clicks, or their relative location (e.g., whether the user typically clicks correctly an on-screen button, or sometimes misses the button and clicks nearby); the particular type of manner that the user chose to convey input (e.g., whether the user clicked on "submit" button, or pressed the "enter" key; or, whether the use moved between form fields by using the "tab" key or by using the mouse cursor); particular sequences of keys or characters that the user enters more rapidly (or more slowly) relative to other characters or sequences; particular manner or pattern in which the user navigates within fields or within a page or an application; and/or other suitable features, for example: device movements or input-unit movement during interaction, movement and/or orientation and/or acceleration of the entire device (e.g., a smartphone or tablet) during the interaction, whether one single finger or multiple particular fingers are used for interacting, the relations between fingers while interacting, the relation to other body parts while interacting, and/or other suitable gesture parameters. Optionally a deep learning algorithm and/or a machine learning algorithm or other suitable Artificial Intelligence (A.I.) algorithm may be utilized, in order to learn and to define a user-specific profile based on the data that is monitored or produced during the interaction (and optionally, immediately prior to the interaction and/or immediately after the interaction); optionally, without necessarily using any specific pre-define features or characteristics or features, and optionally using a heuristic approach or holistic approach or "fuzzy logic" algorithm that attempts to find a unique identifier or a unique digital footprint without necessarily being tied to a specific biometric parameter or to a set of pre-defined biometric parameters. Some embodiments may thus generate a user-specific biometric profile or biometric signature, without pre-defining a set of biometric characteristics or parameters that are then used to calculate the signature or profile; but rather, by utilizing deep learning which utilizes mathematical generation of a unique profile or signature without necessarily defining or pre-defining the set of physical parameters that would be used for differentiating among users.

Optionally, an interference injector 118 may operate to introduce, add, inject, generate and/or otherwise cause an interference (or anomaly, or aberration, or inconsistency, or deviation, or input-output interference, or input/output anomaly) to the input and/or the output as they are reflected to the user who utilizes the end-user device. Such intentionally-introduced input/output interference may be, for example: temporarily hiding or removing the on-screen mouse-pointer or on-screen pointer, in order to elicit the user to react and to make gestures in an attempt to revive the hidden on-screen pointer; intentional deviations or "jumps" in the movement of the on-screen pointer, relative to the actual manual gesture that is performed by the human user (e.g., the human user drags the mouse eastbound, but the on-screen pointer deviates and moves north-east, thereby eliciting a corrective movement or corrective gestures by the user); intentionally moving or re-locating an on-screen interface component (e.g., a "submit" button or a "next" button) while the user is dragging an on-screen pointer; and/or other suitable interferences or anomalies, whose goal is to elicit the user to react and/or to perform corrective steps or corrective gestures; thereby enabling the user-specific features extractor 115 to further extract user-specific attributes or features that characterizes such corrective gestures or such reactions to anomalies; e.g., the time period that it takes the user to notice the anomaly and/or to correct it; the manner in which the user corrects the anomaly (e.g., whether the user tries to locate a disappeared on-screen pointer, by shaking his mouse, or by moving the mouse sideways, or by moving the mouse clockwise, or by moving the mouse counter-clockwise, or by clicking the mouse-button once, or by clicking the mouse-button multiple times, or by typing on the keyboard.

In some embodiments, a corrective gestures analyzer unit 119 may monitor, track, analyze and/or characterize such corrective actions or gestures of the user in response to such interference or anomaly or aberration. In some embodiments, a user reaction analyzer unit 120 may monitor, track, analyze and/or characterize such gestures or reactions of the user in response to such interference (which may not necessarily involve a corrective action). In some embodiments, these functionalities, of the corrective gestures analyzer unit 119 and/or the user reaction analyzer unit 120 may be part of the functionality of the user-specific features extractor 115.

It is noted that in some embodiments, interferences may be injected or used continuously; or may be used only in particular portions or regions of the computerized service (e.g., only on certain pages of a website, or only when certain functionalities of the application are requested, such as high-risk or higher-risk functions); or may be injected pseudo-randomly, or at pre-defined time intervals; or may be injected if one or more other conditions are true (e.g., if there are other indicators of fraudulent activity or irregular activity); or may not be injected at all, for a particular user or for a particular usage-session, or for all users or for a group of users. In some embodiments, optionally, an interference selector module 121 may select or may determine, based on one or more criteria or conditions, whether or not to introduce an interference, or whether (or when exactly, or where exactly) to trigger or to command the interference generator 118 to generate an interference; optionally by selecting a suitable interference from a pre-defined interferences pool 122. For example, the interference selection may be based on user characteristics, and/or based on attributes of the computerized service, and/or based on pseudo-random selection; or by selecting interferences of a type that was not yet used for a particular user, or conversely by selecting interferences of a type that had been already used for a particular user, or by taking into account the level of risk associated with a user-requested functionality of the computerizes service, or the like. The injection of interferences, and/or the analysis of user reactions to interference, and/or the analysis of corrective gestures, may be optional.

If the comparator/matching module 117 determines that one or more features, or a set of features, that characterize the current interaction session of the current user, does not match those features as extracted in previous interaction session(s) of that user, then, a possible-fraud signal may be generated or sent or transmitted to other units of system 100 and/or to pre-defined recipients.

For example, combined factors and data may be taken into account by a user identity determination module 131, which may determine or estimate whether or not the current user is a "fraudster" or an attacker or an imposter. The user identity determination module 131 may trigger or activate a fraud mitigation module 132 able to perform one or more fraud mitigating steps based on that determination or estimation; for example, by requiring the current user to respond to a challenge, to answer security question(s), to contact customer service by phone, to perform two-step authentication or two-factor authentication, or the like.

In accordance with the present invention, system 100 may comprise a user authentication module 150 which may enable system 100 and/or computerized service 102 and/or end-user device 101 to perform user authentication, or to authenticate or verify or confirm the identity of a user of end-user device 101 (or of computerized service 102), and/or to utilize the unique behavior and/or gestures and/or reactions of the user as a user-identifying feature that may authorize a log-in or may authorize access or may authorize a password recover or a password reset process.

The user authentication module 150 may be able to distinguish between (i) a legitimate user that accesses multiple different accounts of a particular computerized service, optionally from the same single computing device and/or from the same single IP address; and (ii) an illegitimate user or attacker or cyber-attacker that accesses multiple different accounts of a particular computerized service, optionally from the same single computing device and/or from the same single IP address.

Figure 2:
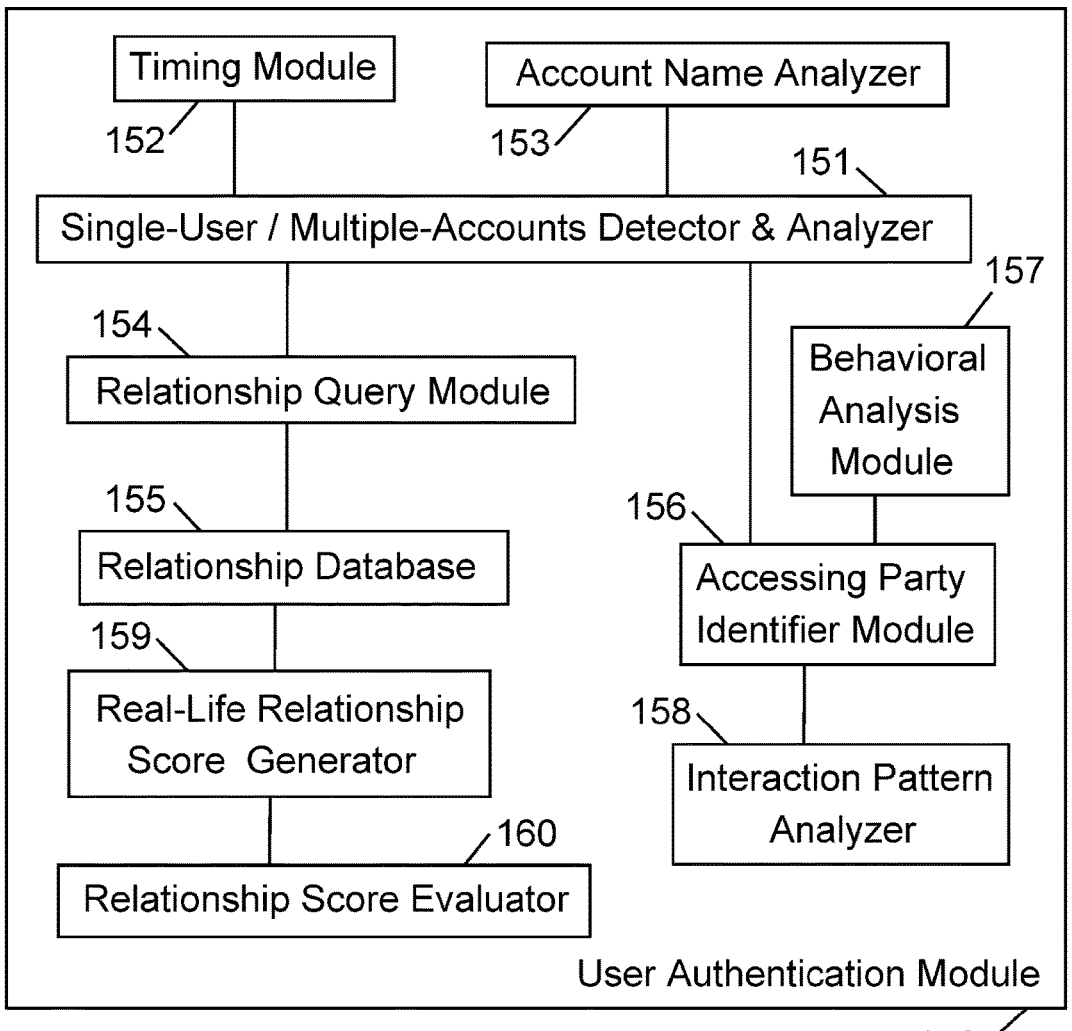
FIG. 2 is a schematic block-diagram illustration of a user authentication module, in accordance with some demonstrative embodiments of the present invention.

Reference is made to FIG. 2, which is a schematic block-diagram illustration of user authentication module 150 and its associated components, in accordance with some demonstrative embodiments of the present invention.

User authentication module 150 may comprise a single-user/multiple-accounts detector & analyzer 151, able to detect or to estimate the same, single, user has accessed multiple accounts of the same computerized service; optionally from the same device or computing device, and/or from the same IP address; and further able to analyze such usage-case in order to determine whether the single user is a legitimate user or an illegitimate attacker. Optionally, a timing module 152 may indicate that the multiple access sessions were performed over a short period of time (e.g., ten minutes, 30 minutes, one hour), which is smaller than a pre-defined threshold value. The detection may be based, for example, on identifying that the same IP address, same web-browser (e.g., same user agent, same cookie) is utilized within a short period of time, to access multiple accounts on the same computerized service. In some embodiments, the system may detect that a first account was accessed, then logged-out, and then immediately the same user utilizes the same device to log-in again into the service but through a different account (e.g., a different set of username/password strings).

In some embodiments, the single-user/multiple-accounts detector & analyzer 151 may generate as output a binary-type determination, indicating either: (I) that the single user who accessed multiple different accounts is a legitimate user, or (II) that the single user who accessed multiple different accounts is an illegitimate user or cyber-attacker. In other embodiments, the single-user/multiple-accounts detector & analyzer 151 may generate as output a ternary-type determination, indicating either: (I) that the single user who accessed multiple different accounts is a legitimate user, or (II) that the single user who accessed multiple different accounts is an illegitimate user or cyber-attacker, or (III) that the system does not have sufficient data in order to positively select option (I) or option (II). In still other embodiments, the single-user/multiple-accounts detector & analyzer 151 may generate as output a fraud-probability score, indicating the estimated probability (e.g., on a scale of 0 to 100, or other suitable range of values) that the single user that accessed multiple accounts is an illegitimate user or an attacker; and such fraud-probability score may be utilized in conjunction with other parameters (e.g., the type of transaction that the user attempts to perform; the monetary amount of transaction involved) in order to further determine whether to take remedial actions (e.g., to block or reject a transaction; to block access to an account; to notify the account-owner via email or text message; to notify a fraud department; or the like).

An Account Name Analyzer 153 may analyze the names that are registered as the owners of the multiple suspicious accounts, in order to deduce or extract insights for automatic distinguishing between legitimate access and illegitimate access. For example, the system may determine that the first account is owned by "Adam Smith", and that the second account is owned by "Barbara Smith"; and may detect that these two account-owners share the same family-name or the same last-name, or a partially-overlapping last-name (e.g., the second user is "Barbara Brown-Smith", indicating a maiden name and a current family name). The system may thus determine that these two account-owners may be related by family connection; and therefore, one of the two legitimate users is legitimately utilizing the credentials of the other family-members such as, a husband logging-in into his wife's banking account, or a wife logging-in into her husband's banking account. The system may therefore determine, based on the identical or similar or partially-overlapping family name, that these two usage sessions do not belong to a cyber-attacker, and are probably originating from a single legitimate user, or from two legitimate users operating in series (e.g., a husband checking his account first, and immediately after, his wife checking her account via the same computer).

Optionally, a Relationship Query Module 154 may query a Relationship Database 155, in order to determine whether two account-owners are related to each other (e.g., by family membership, by blood, by marriage, by living in the same household, or the like), even if their last-name or family-name is not identical or not similar or not overlapping. For example, the system may detect that two accounts were accessed from the same computer within a short period of time, the first account being owned by "Adam Smith", and the second account being owned by "Barbara Brown". The Relationship Query Module 154 may query whether these two persons are known to be inter-related, based on their names, and/or based on additional data that may appear in the profile of each account (e.g., city of residence, zip code, street address).

The Relationship Database 155 may return an indication that these two persons may be related to each other, such as being a husband and a wife (e.g., the wife retained her maiden name after their marriage). Such information may be available through or from one or more internal and/or external databases, public records (e.g., birth certificate of a child names "John Smith" that shows his parents as Adam Smith and Barbara Brown; or marriage certificate), mortgage databases, liens records, real estate deeds and/or records (e.g., a real estate deed indicating that Adam Smith and Barbara Brown bought the same house or sold the same house or own the same house), property tax records (e.g., indicating that a particular house is owned by Adam Smith and Barbara Brown), other tax records, phone books, White Pages books or records, credit history or credit score databases, banking databases, social media or social networks (e.g., a Facebook profile of Adam Smith which states that he is married to Barbara Brown), or other suitable sources.

In some embodiments, a Real-Life Relationship Score Generator 159 may generate a score value, indicating the existence and/or the strength of a real-life relationship or connection or association, between two particular persons or corporate entities. For example, a husband and wife may have a score value of 95 (on a scale of 0 to 100); a parent and child may have a score value of 92; a holding-company and its subsidiary may have a score value of 88; a person and his ex-spouse may have a score value of 50; two un-related persons may have a score value of 0 (or a single-digit value close to zero); or the like. The score value generation may be based on public databases, private databases, government records, public records, social network information, corporate records, or the like.

In some embodiments, a Relationship Score Evaluator 160 may evaluate, or may take into account, the generated relationship score value, and optionally may take into account additional data (e.g., past or historical data about the two accounts, or the two account-owners; textual or contextual analysis of the names of the two accounts or account-owners; or the like), in order to assess how strong the real-life connect is, or is estimated to be. In some embodiments, the real-life relationship score value may be compared to a threshold score value, or may be matched with or checked against a range of values; such that, for example, a relationship score value that is greater than a predefined threshold may indicate that the two accounts or the two account-owners are sufficiently related to each other in real life and thus the single user that accesses both of the accounts is more probably or most probably a legitimate user; whereas, a relationship score value that is lower than the predefined threshold may indicate that the two accounts or the two account-owners are not sufficiently related to each other in real life and thus the single user that accesses both of the accounts is more probably an illegitimate cyber-attacker.

Optionally, the Relationship Database 155 may store or may indicate past information or historical information, which may depict the status in a past time-point, and which may not be correct for the present time, but which may still be useful for the particular purpose of automatically determining whether a single user is legitimately accessing two different accounts. For example, the Relationship Database 155 may store data indicating that although at present, the bank account of Adam Smith and the bank account of Barbara Brown are not inter-linked by any means, three years ago the two accounts were actually inter-linked, or were used interchangeably in order to pay-off the same single mortgage, or had been associated in the past with the same mailing address; such that, even though at present the two accounts, including their current account data and account profile data, do not show any present indication of inter-linking, their past or historic data shows that they are owned today by two persons that used to be related; thereby decreasing the chance that a cyber-attacker is accessing these two accounts in series, and allowing the system to determine that a single legitimate user is accessing the two accounts.

Optionally, the Relationship Database 155 may further comprise or provide indications about corporate or organizational connections between or among entities; for example, indicating that "T-Rex Industries Inc." is a subsidiary of "T-Rex Technologies Inc.". Such information may be obtained from various sources, such as, corporate filings, Department of State records, Company Registrar records, liens record, annual reports, quarterly reports, Security and Exchange Commission (SEC) filings or documents, Yellow Pages databases or books, and/or other suitable resources. In some embodiments, the resources may be public, or may be internal and private to the computerized service; for example, a banking system may store information that "T-Rex Industries Inc." has a signatory named Adam Smith, and that "Brown Technologies Inc." has a signatory names Adam Smith, and therefore the banking system may determine that these two companies are related even though they do not have a common or overlapping name.

In some embodiments, the Account Name Analyzer 153 may determine or may detect that the two accounts are otherwise related based on a particular type of string or keyword that may be part of the account name. For example, the first account owner is "Adam Smith", and the second account owner is "Jane Smith, Minor" or "Jane Smith, UTMA" or "Jane Smith, Minor Beneficiary", or "Smith Family Trust" or "Smith Estate". Such keywords, indicating a trustee or custodian or other particular relationship, may trigger the system to determine that the two accounts are indeed related to the same human being, and thus the two usage-sessions are of a legitimate user and not a cyber-attacker.

Optionally, an Accessing Party Identifier Module 156 may identify one or more properties of the single user that accessed the multiple accounts over a short period of time, in order to distinguish between a legitimate user and an attacker. For example, the Accessing Party Identifier Module 156 may extract the IP address of the accessing party; and may run a Reverse IP query or a WHOISE query, which may indicate that the accessing party is an entity that operates an accounting service or bookkeeping service, or a funds management or assets management service, or a consulting service for clients, or an attorney or law firm, or a payroll service, or similar consulting entity that typically serves multiple clients and that may in the normal course of business receive direct access to client's online accounts. Once the Accessing Party Identifier Module 156 determines that the accessing party is such type of entity, the system may thus determine that the single user that accessed the multiple accounts is a legitimate user (e.g., a professional consultant or service provider), and not a cyber attacker.

In some embodiments, a Behavioral Analysis Module 157 may monitor and analyze the user gestures and/or input-output operations performed by the accessing user when accessing or utilizing each one of the multiple accounts, and/or may monitor and analyze the particular characteristics of the user when accessing or utilizing each one of the multiple accounts. For example, the Behavioral Analysis Module 157 may determine that: (i) when operating the account of Adam Smith, the user clicked the Submit button with the mouse, and moved between fields in an online form using the mouse; whereas, (ii) when operating the account of Barbara Brown, from the same browser and the same device and the same IP address and only five minutes after the usage session of Adam Smith, the user moved between fields using the TAB key and the user submitted a form using the ENTER key. Accordingly, the Behavioral Analysis Module 157 may determine that the two usage sessions of the two accounts, which appeared at first to belong to a single user that utilized the same single device and browser and IP address, actually originated from two different human users, each user having his or her unique behavioral pattern or behavioral fingerprint or behavioral characteristics.

Optionally, an input-output or GUI or usage interference (or aberration, or abnormality, or irregularity) may be injected or inserted or added or introduced to the service, to enable the Behavioral Analysis Module 157 to look for (and to analyze) user reaction and/or corrective actions or corrective measures performed by the user; and further enabling the Behavioral Analysis Module 157 to determine, based on different user reactions to aberrations, or based on different corrective actions in response to interferences, that the two usage sessions actually originated from two different users and not from the same single human user.

Furthermore, an Interaction Pattern Analyzer 158 may monitor, log and/or analyze the particular pattern of interaction(s) that the user performs in each one of the multiple accounts being accessed (e.g., from the same device, and from the same IP address, over a short period of time), in order to determine that a unique, abnormal or irregular pattern is common to them, which is not typically found in a random pair or batch of different users accessing different accounts, thereby indicating that the same single user is an illegitimate user or an attacker. For example, the Interaction Pattern Analyzer 158 may analyze the interactions performed in two banking accounts; and may detect that in each account, the same series of operations were performed (e.g., the user logged-in; the user changed the account settings to remove an email alert about wire transfers; then the user clicked on "perform wire transfer" without firstly querying for the current account balances; then the user entered wire transfer data, submitted the order, and logged out). Such unique series of interactions may be common to the two accounts that were accessed from the same device and/or the same browser and/or the same IP address; but may not be typical to the general population of users of that service, since a typical legitimate user does not typically disable email alert notifications prior to performing a wire transfer. The Interaction Pattern Analyzer 158 may thus determine that this particular chain of interactions, that characterized the two (or more) usage sessions of the two (or more) accounts that were accessed from the same device and/or from the same IP address, or the frequency of such interactions, does not match the normal distribution of chains of interactions of the general population of users of the service (e.g., as deduced from reviewing the interactions in numerous other accounts of that computerized service). This may trigger the Interaction Pattern Analyzer 158 to determine that the single user is actually a cyber-attacker that accessed two different accounts and exhibited the same (or similar, e.g., beyond a level-of-similarity threshold) pattern of interactions.

The patterns of interactions need not be exactly identical; and may be sufficiently similar beyond a pre-defined level of similarity in order to declare a possible cyber attacker. For example, even if in one of the two chains of interactions (and not in the other one), the user has also checked the account balance before performing the wire transfer, the Interaction Pattern Analyzer 158 may still determine that the two chains of interactions were sufficiently similar (e.g., 80% of the operations or interactions were identical, and were performed in the same order or sequence or timing), and thus a cyber-attacker can be declared.

It is noted that in accordance with the present invention, monitoring and/or analyzing of "user interactions" and/or "user gestures", may further comprise the monitoring and/or analyzing of interactions, gestures, and/or sensed data that is collected shortly before or immediately before the actual interaction, and/or interactions, gestures, and/or sensed data that is collected shortly after or immediately after the actual interaction; in addition to the data collected or sensed or monitored during the interaction itself.

The terms "mobile device" or "mobile electronic device" as used herein may include, for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, or the like.

The term "pointing device" as used herein may include, for example, a mouse, a trackball, a pointing stick, a stylus, a joystick, a motion-sensing input device, a touch screen, a touch-pad, or the like.

The terms "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, a smartphone, a tablet, a smart-watch, and/or other suitable machines or devices.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass®); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

Some embodiments may be utilized to identify or detect a remote access attacker, or an attacker or a user that utilizes a remote access channel to access (or to attack, or to compromise) a computerized service, or an attacker or cyber-attacker or hacker or impostor or imposter or "fraudster" that poses as a genuine user or as a true owner of an account, or an automatic script or "bot" or malware. Some embodiments may be used to differentiate or distinguish among, for example, an authorized or legitimate or genuine or human user, as opposed to an illegitimate and/or unauthorized and/or impostor human attacker or human user, and/or as opposed to a "bot" or automatic script or automated script or automated program or malware.

Some embodiments may be utilized for authenticating, or confirming the identity of, a user who is already logged-in or signed-in; or conversely, a user that did not perform (or did not yet perform, or did not complete) a log-in or sign-in process; or a user that did not successfully perform a log-in or sign-in process; or a user who is interacting with a computerized service prior to signing-in or logging in (e.g., filling-out fields in an electronic commerce website as part of checking-out as a guest), or during a log-in process, or after a log-in process; or to confirm the identity of a user who is already-logged-in, or who is not-yet logged-in, or who operates a system or service that does not necessarily require or utilize a log-in process.

The term "password" as used herein may be or may comprise, for example, a password or pass-phrase or Personal Identification Number (PIN), or other data-item or secret, or other confidential data-item, which may be used for user authentication or for logging-in or sign-in of a user into an electronic device (e.g., smartphone, tablet, smart-watch, laptop computer, desktop computer) or a service (e.g., banking service or website, brokerage service or website, email account, web-mail, social network, online vendor, online merchant, electronic commerce website or application or "app"), or other data-item or string that may be used as authentication factor or authentication step (e.g., in a single-step or multiple-step authentication process), or other log-in data that may be used in order to authorized access to a privileged service and/or to a privileged location (e.g., entry into, or exit from, or passage through a gate or card-reader or turnstile), or other log-in data item that may be used in order to authorize a user to perform privileged actions (e.g., to unlock or open a device or a vehicle; to start or ignite a vehicle; to drive a vehicle).

The terms "service" or "computerized service", as used herein, may be or may comprise any suitable service, or system, or device, which may require user authentication in order to authorize user access to it, or in order to authorize performance of one or more particular actions; including, but not limited to, for example, user authentication for accessing or operating or unlocking an electronic device (e.g., smartphone, tablet, smart-watch, laptop computer, desktop computer, smart-home device or appliance, Internet of Things (IoT) device) or service (e.g., banking service or website, brokerage service or website, email account, webmail, social network, online vendor, online merchant, electronic commerce website or application or "app"), or other system or platform that requires user authentication (e.g., entry into, or exit from, or passage through a gate or card-reader or turnstile; to unlock or open a device or a vehicle; to start or ignite a vehicle; to drive a vehicle).

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a Wireless Area Network (WAN), a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using (or as part of), an "app" or application which may be downloaded or obtained from an "app store" or "applications store", for free or for a fee, or which may be pre-installed on a computing device or electronic device, or which may be otherwise transported to and/or installed on such computing device or electronic device.

In accordance with some embodiments of the present invention, a method comprises: (a) detecting that within a pre-defined period of time, a single user is attempting to access, via a single computing device, two or more different accounts of a computerized service; wherein the two or more different accounts comprise at least: a first account that belongs to a first account-owner, and a second account that belongs to a second account-owner; (b) generating a linkage score value that indicates a strength of a real-life linkage between the first account owner and the second account-owner; (c) based on the generated linkage score value that indicates the strength of real-life linkage between the first account owner and the second account-owner, determining whether said single user is either (I) a legitimate human user that is genuinely associated with each one of said two or more accounts, or (II) a cyber-attacker that is illegitimately attempting to access multiple accounts.

In some embodiments, the determining of step (c) is performed by generating a fraud-probability score, which indicates a probability that said single user is a cyber-attacker.

In some embodiments, the determining of step (c) is performed by generating a binary-type indication which indicates either: (I) a determination that said single user is a legitimate human user that is genuinely associated with each one of said two or more accounts, or (II) a determination that said single user is a cyber-attacker that is illegitimately attempting to access multiple accounts.

In some embodiments, if the generated linkage score value that indicates the strength of real-life linkage between the first account owner and the second account-owner, is greater than a pre-defined threshold value, then determining that said single user is a legitimate human user that is genuinely associated with each one of said two or more accounts; if the generated linkage score value that indicates the strength of real-life linkage between the first account owner and the second account-owner, is smaller than said pre-defined threshold value, then determining that said single user is a cyber-attacker that is illegitimately attempting to access multiple accounts.

In some embodiments, the determining of step (c) comprises: (A) determining that the first account-owner and the second account-owner have different first-names and also have the same family-name; (B) based on the determining of step (A), determining that said single user is a legitimate human user that is genuinely associated with each one of said first account and second account.

In some embodiments, the determining of step (c) comprises: (A) determining that the first account-owner and the second account-owner have different first-names; and further determining that the family-name of the first account-owner comprises (i) the family name of the second account-owner, and also (ii) an additional string; (B) based on the two determining operations of step (A), determining that said single user is a legitimate human user that is genuinely associated with each one of said first account and second account.

In some embodiments, the determining of step (c) comprises: (A) determining that the first account-owner and the second account-owner are associated with the same real-life address; (B) based on the determining of step (A), determining that said single user is a legitimate human user that is genuinely associated with each one of said first account and second account.

In some embodiments, the determining of step (c) comprises: (A) determining that the first account-owner and the second account-owner were previously accessed by two legitimate users from a same, single, Internet Protocol (IP) address; (B) based on the determining of step (A), determining that said single user is a legitimate human user that is genuinely associated with each one of said first account and second account.

In some embodiments, the determining of step (c) comprises: (A) determining that the first account-owner and the second account-owner were previously accessed by two legitimate users from a same, single, electronic device; (B) based on the determining of step (A), determining that said single user is a legitimate human user that is genuinely associated with each one of said first account and second account.

In some embodiments, the determining of step (c) comprises: (A) determining that the first account-owner and the second account-owner are associated with the same single employer; (B) based on the determining of step (A), determining that said single user is a legitimate human user that is genuinely associated with each one of said first account and second account.

In some embodiments, the determining of step (c) comprises: (A) determining that the first account-owner and the second account-owner are associated with the same single corporate entity; (B) based on the determining of step (A), determining that said single user is a legitimate human user that is genuinely associated with each one of said first account and second account.

In some embodiments, the determining of step (c) comprises: (A) by querying a database that stores data about real-life relationship between people, determining that there exists a family relationship between the first account-owner and the second account-owner even though the first and account-owner and the second account-owner do not have the same last-name; (B) based on the determining of step (A), determining that said single user is a legitimate human user that is genuinely associated with each one of said first account and second account.

In some embodiments, the determining of step (c) comprises: (A) by querying a database that stores data about real-life relationship between people, determining that the first account-owner is a spouse of the second account-owner; (B) based on the determining of step (A), determining that said single user is a legitimate human user that is genuinely associated with each one of said first account and second account.

In some embodiments, the determining of step (c) comprises: (A) by querying a database that stores data about real-life relationship between people, determining that the first account-owner is a parent of the second account-owner; (B) based on the determining of step (A), determining that said single user is a legitimate human user that is genuinely associated with each one of said first account and second account.

In some embodiments, the determining of step (c) comprises: (A) by querying a database that stores data about corporate relationship among corporate entities, determining that: the first account-owner, who is a first corporate entity, is affiliated by a corporate relationship with the second account-owner, who is a second corporate entity; (B) based on the determining of step (A), determining that said single user is a legitimate human user that is genuinely associated with each one of said first account and second account.

In some embodiments, the determining of step (c) comprises: (A) by querying a database that stores data about corporate relationship among corporate entities, determining that: the first account-owner, who is a first corporate entity, is a subsidiary of the second account-owner, who is a second corporate entity; (B) based on the determining of step (A), determining that said single user is a legitimate human user that is genuinely associated with each one of said first account and second account.

In some embodiments, the determining of step (c) comprises: (A) by querying a database that stores data about corporate relationship among corporate entities, determining that the same majority shareholder owns a majority interest in the first account-owner and also owns a majority interest in the second account-owner; (B) based on the determining of step (A), determining that said single user is a legitimate human user that is genuinely associated with each one of said first account and second account.

In some embodiments, the determining of step (c) comprises: (A) analyzing a similarity between (i) a corporate name of the first account-owner, and (ii) a corporate name of the second account-owner; and based on said analyzing, determining that: the first account-owner, who is a first corporate entity, is affiliated by a corporate relationship with the second account-owner, who is a second corporate entity; (B) based on the determining of step (A), determining that said single user is a legitimate human user that is genuinely associated with each one of said first account and second account.

In some embodiments, the determining of step (c) comprises: (A) determining that said single user accessed said first account and said second account, via the same single computing device which is associated with a funds-managing entity that manages funds for clients; (B) determining that the first account belongs to a first client of said funds-managing entity; (C) determining that the second account belongs to a second client of said funds-managing entity; (D) based on the determining operations of steps (A) and (B) and (C), determining that said single user is a legitimate human user that is genuinely associated with each one of said first account and second account.

In some embodiments, the determining of step (c) comprises: (A) determining that said single user accessed said first account and said second account, via the same single computing device which is associated with an accounting service provider that provides accounting services to clients; (B) determining that the first account belongs to a first client of said accounting service provider; (C) determining that the second account belongs to a second client of said accounting service provider; (D) based on the determining operations of steps (A) and (B) and (C), determining that said single user is a legitimate human user that is genuinely associated with each one of said first account and second account.

In some embodiments, the determining of step (c) comprises: (A) determining that said single user accessed said first account and said second account, via the same single computing device which is associated with a payroll service provider that provides payroll services to clients; (B) determining that the first account belongs to a first client of said payroll service provider; (C) determining that the second account belongs to a second client of said payroll service provider; (D) based on the determining operations of steps (A) and (B) and (C), determining that said single user is a legitimate human user that is genuinely associated with each one of said first account and second account.

In some embodiments, the determining of step (c) comprises: (A) determining that said single user accessed said first account and said second account, via the same single computing device which is associated with a consulting service provider that provides consulting services to clients; (B) determining that the first account belongs to a first client of said consulting service provider; (C) determining that the second account belongs to a second client of said consulting service provider; (D) based on the determining operations of steps (A) and (B) and (C), determining that said single user is a legitimate human user that is genuinely associated with each one of said first account and second account.

In some embodiments, the determining of step (c) comprises: (A) determining that the first account-owner is a legal custodian of the second account-owner; (B) based on the determining of step (A), determining that said single user is a legitimate human user that is genuinely associated with each one of said first account and second account.

In some embodiments, the determining of step (c) comprises: (A) determining that there exists a trustee-and-beneficiary relationship between the first account-owner and the second account-owner; (B) based on the determining of step (A), determining that said single user is a legitimate human user that is genuinely associated with each one of said first account and second account.

In some embodiments, the determining of step (c) comprises: (A) determining that the first account and the second account are currently non-linked to each other; and further determining that the first account and the second account used to be linked to each other at a past time-point; (B) based on the determining of step (A), determining that said single user is a legitimate human user that is genuinely associated with each one of said first account and second account.

In some embodiments, the method comprises: (A) monitoring operations that said single user performs as logged-in user in said first account; (B) determining a first pattern of operations that said single user performed as logged-in user in said first account; (C) monitoring operations that said single user performs as logged-in user in said second account; (D) determining a second pattern of operations that said single user performed as logged-in user in said second account; (E) determining that the first pattern of operations is identical to the second pattern of operations; (F) based on the determining of step (E), determining that said single user is a cyber-attacker attempting to attack said first account and said second account.

In some embodiments, the method comprises: (A) monitoring operations that said single user performs as logged-in user in said first account; (B) determining a first pattern of operations that said single user performed as logged-in user in said first account; (C) monitoring operations that said single user performs as logged-in user in said second account; (D) determining a second pattern of operations that said single user performed as logged-in user in said second account; (E) determining that the first pattern of operations is similar, beyond a pre-defined level of similarity, to the second pattern of operations; (F) based on the determining of step (E), determining that said single user is a cyber-attacker attempting to attack said first account and said second account.

In some embodiments, the method comprises: (A) monitoring operations that said single user performs as logged-in user in said first account; (B) determining a first pattern of operations that said single user performed as logged-in user in said first account; (C) monitoring operations that said single user performs as logged-in user in said second account; (D) determining a second pattern of operations that said single user performed as logged-in user in said second account; (E) determining that the first pattern of operations is identical to the second pattern of operations, and further determining that the first account is not related to the second account; (F) based on the determining operations of step (E), determining that said single user is a cyber-attacker attempting to attack said first account and said second account.

In some embodiments, the method comprises: (A) monitoring operations that said single user performs as logged-in user in said first account; (B) determining a first pattern of operations that said single user performed as logged-in user in said first account; (C) monitoring operations that said single user performs as logged-in user in said second account; (D) determining a second pattern of operations that said single user performed as logged-in user in said second account; (E) determining that the first pattern of operations is similar, beyond a pre-defined level of similarity, to the second pattern of operations, and further determining that the first account is not related to the second account; (F) based on the determining operations of step (E), determining that said single user is a cyber-attacker attempting to attack said first account and said second account.

In some embodiments, the method comprises: (A) monitoring operations that said single user performs as logged-in user in said first account; (B) determining a first pattern of operations that said single user performed as logged-in user in said first account; (C) monitoring operations that said single user performs as logged-in user in said second account; (D) determining a second pattern of operations that said single user performed as logged-in user in said second account; (E) determining that the first pattern of operations is identical to the second pattern of operations, and further determining that the first pattern of operations is abnormal relative to a general distribution of operation patterns of a general group of users of said computerized service; (F) based on the determining of step (E), determining that said single user is a cyber-attacker attempting to attack said first account and said second account.

In some embodiments, the method comprises: (A) monitoring operations that said single user performs as logged-in user in said first account; (B) determining a first pattern of operations that said single user performed as logged-in user in said first account; (C) monitoring operations that said single user performs as logged-in user in said second account; (D) determining a second pattern of operations that said single user performed as logged-in user in said second account; (E) determining that the first pattern of operations is similar, beyond a pre-defined level of similarity, to the second pattern of operations, and further that the first pattern of operations is abnormal relative to a general distribution of operation patterns of a general group of users of said computerized service; (F) based on the determining of step (E), determining that said single user is a cyber-attacker attempting to attack said first account and said second account.

In some embodiments, the method comprises: (A) monitoring operations that said single user performs as logged-in user in said first account; (B) determining a first pattern of operations that said single user performed as logged-in user in said first account; (C) monitoring operations that said single user performs as logged-in user in said second account; (D) determining a second pattern of operations that said single user performed as logged-in user in said second account; (E) determining that the first pattern of operations is identical to the second pattern of operations, and further determining that the first account is non-related to the second account, and further determining that the first pattern of operations is abnormal relative to a general distribution of operation patterns of a general group of users of said computerized service; (F) based on the determining of step (E), determining that said single user is a cyber-attacker attempting to attack said first account and said second account.

In some embodiments, the method comprises: (A) monitoring operations that said single user performs as logged-in user in said first account; (B) determining a first pattern of operations that said single user performed as logged-in user in said first account; (C) monitoring operations that said single user performs as logged-in user in said second account; (D) determining a second pattern of operations that said single user performed as logged-in user in said second account; (E) determining that the first pattern of operations is similar, beyond a pre-defined level of similarity, to the second pattern of operations, and further determining that the first account is non-related to the second account, and further that the first pattern of operations is abnormal relative to a general distribution of operation patterns of a general group of users of said computerized service; (F) based on the determining of step (E), determining that said single user is a cyber-attacker attempting to attack said first account and said second account.

The present invention comprises devices, systems, and methods of user authentication, as well as automatic differentiation between a legitimate user and a cyber-attacker. For example, a system detects that two different accounts of the same computerized service, were accessed by a single computing device over a short period of time. The system may employ various techniques in order to determine automatically whether a legitimate user accessed the two different account, such as, a husband accessing his own bank account and shortly after that accessing also his wife's bank account, or a payroll company accessing bank accounts of two clients for payroll management purposes. Conversely, the system is able to detect that the same user exhibited the same pattern of interactions when operating the two accounts, a pattern of interactions that does not frequently appear in the general population of legitimate users, thereby indicating that the single user is a cyber-attacker.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
    (a) detecting that within a pre-defined period of time, a single user is attempting to access, via a single computing device,
        a first account that belongs to a first account-owner, and
        a second account that belongs to a second account-owner;
    (b) querying a database that stores data about real-life relationship between people, and determining existence of a real-life family linkage or a real-life business linkage, between the first account owner and the second account-owner;
    (c) based on said real-life linkage, determining that said single user is a legitimate human user that is genuinely associated with each one of said accounts, and is not a cyber-attacker that is illegitimately attempting to access multiple accounts.

2. The method of claim 1, wherein the determining of step (c) is performed by generating a fraud-probability score, which indicates a probability that said single user is a cyber-attacker.

3. The method of claim 1, wherein the determining of step (c) is performed by generating a binary-type indication which indicates either: (I) a determination that said single user is a legitimate human user that is genuinely associated with each one of said two or more accounts, or (II) a determination that said single user is a cyber-attacker that is illegitimately attempting to access multiple accounts.

4. The method of claim 1, wherein,
    if the generated linkage score value that indicates the strength of real-life linkage between the first account owner and the second account-owner, is greater than a pre-defined threshold value, then determining that said single user is a legitimate human user that is genuinely associated with each one of said two or more accounts;
    if the generated linkage score value that indicates the strength of real-life linkage between the first account owner and the second account-owner, is smaller than said pre-defined threshold value, then determining that said single user is a cyber-attacker that is illegitimately attempting to access multiple accounts.

5. The method of claim 1, wherein the determining of step (c) comprises:
    (A) determining that the first account-owner and the second account-owner have different first-names and also have the same family-name;
    (B) based on the determining of step (A), determining that said single user is a legitimate human user that is genuinely associated with each one of said first account and second account.

6. The method of claim 1, wherein the determining of step (c) comprises:
    (A) determining that the first account-owner and the second account-owner have different first-names; and further determining that the family-name of the first account-owner comprises (i) the family name of the second account-owner, and also (ii) an additional string;
    (B) based on the two determining operations of step (A), determining that said single user is a legitimate human user that is genuinely associated with each one of said first account and second account.

7. The method of claim 1, wherein the determining of step (c) comprises:
    (A) determining that the first account-owner and the second account-owner are associated with the same real-life address;
    (B) based on the determining of step (A), determining that said single user is a legitimate human user that is genuinely associated with each one of said first account and second account.

8. The method of claim 1, wherein the determining of step (c) comprises:
(A) determining that the first account-owner and the second account-owner were previously accessed by two legitimate users from a same, single, Internet Protocol (IP) address;
(B) based on the determining of step (A), determining that said single user is a legitimate human user that is genuinely associated with each one of said first account and second account.

9. The method of claim 1, wherein the determining of step (c) comprises:
(A) determining that the first account-owner and the second account-owner were previously accessed by two legitimate users from a same, single, electronic device;
(B) based on the determining of step (A), determining that said single user is a legitimate human user that is genuinely associated with each one of said first account and second account.

10. The method of claim 1, wherein the determining of step (c) comprises:
(A) determining that the first account-owner and the second account-owner are associated with the same single employer;
(B) based on the determining of step (A), determining that said single user is a legitimate human user that is genuinely associated with each one of said first account and second account.

11. The method of claim 1, wherein the determining of step (c) comprises:
(A) determining that the first account-owner and the second account-owner are associated with the same single corporate entity;
(B) based on the determining of step (A), determining that said single user is a legitimate human user that is genuinely associated with each one of said first account and second account.

12. The method of claim 1, wherein the determining of step (c) comprises:
(A) by querying a database that stores data about real-life relationship between people, determining that there exists a family relationship between the first account-owner and the second account-owner even though the first and account-owner and the second account-owner do not have the same last-name;
(B) based on the determining of step (A), determining that said single user is a legitimate human user that is genuinely associated with each one of said first account and second account.

13. The method of claim 1, wherein the determining of step (c) comprises:
(A) by querying a database that stores data about real-life relationship between people, determining that the first account-owner is a spouse of the second account-owner;
(B) based on the determining of step (A), determining that said single user is a legitimate human user that is genuinely associated with each one of said first account and second account.

14. The method of claim 1, wherein the determining of step (c) comprises:
(A) by querying a database that stores data about real-life relationship between people, determining that the first account-owner is a parent of the second account-owner;
(B) based on the determining of step (A), determining that said single user is a legitimate human user that is genuinely associated with each one of said first account and second account.

15. The method of claim 1, wherein the determining of step (c) comprises:
(A) by querying a database that stores data about corporate relationship among corporate entities, determining that: the first account-owner, who is a first corporate entity, is affiliated by a corporate relationship with the second account-owner, who is a second corporate entity;
(B) based on the determining of step (A), determining that said single user is a legitimate human user that is genuinely associated with each one of said first account and second account.

16. The method of claim 1, wherein the determining of step (c) comprises:
(A) by querying a database that stores data about corporate relationship among corporate entities, determining that: the first account-owner, who is a first corporate entity, is a subsidiary of the second account-owner, who is a second corporate entity;
(B) based on the determining of step (A), determining that said single user is a legitimate human user that is genuinely associated with each one of said first account and second account.

17. The method of claim 1, wherein the determining of step (c) comprises:
(A) by querying a database that stores data about corporate relationship among corporate entities, determining that the same majority shareholder owns a majority interest in the first account-owner and also owns a majority interest in the second account-owner;
(B) based on the determining of step (A), determining that said single user is a legitimate human user that is genuinely associated with each one of said first account and second account.

18. The method of claim 1, wherein the determining of step (c) comprises:
(A) analyzing a similarity between (i) a corporate name of the first account-owner, and (ii) a corporate name of the second account-owner; and based on said analyzing, determining that: the first account-owner, who is a first corporate entity, is affiliated by a corporate relationship with the second account-owner, who is a second corporate entity;
(B) based on the determining of step (A), determining that said single user is a legitimate human user that is genuinely associated with each one of said first account and second account.

19. The method of claim 1, wherein the determining of step (c) comprises:
(A) determining that said single user accessed said first account and said second account, via the same single computing device which is associated with a funds-managing entity that manages funds for clients;
(B) determining that the first account belongs to a first client of said funds-managing entity;
(C) determining that the second account belongs to a second client of said funds-managing entity;
(D) based on the determining operations of steps (A) and (B) and (C), determining that said single user is a legitimate human user that is genuinely associated with each one of said first account and second account.

20. The method of claim 1, wherein the determining of step (c) comprises:
(A) determining that said single user accessed said first account and said second account, via the same single computing device which is associated with an accounting service provider that provides accounting services to clients;
(B) determining that the first account belongs to a first client of said accounting service provider;
(C) determining that the second account belongs to a second client of said accounting service provider;
(D) based on the determining operations of steps (A) and (B) and (C), determining that said single user is a legitimate human user that is genuinely associated with each one of said first account and second account.

21. The method of claim 1, wherein the determining of step (c) comprises:
(A) determining that said single user accessed said first account and said second account, via the same single computing device which is associated with a payroll service provider that provides payroll services to clients;
(B) determining that the first account belongs to a first client of said payroll service provider;
(C) determining that the second account belongs to a second client of said payroll service provider;
(D) based on the determining operations of steps (A) and (B) and (C), determining that said single user is a legitimate human user that is genuinely associated with each one of said first account and second account.

22. The method of claim 1, wherein the determining of step (c) comprises:
(A) determining that said single user accessed said first account and said second account, via the same single computing device which is associated with a consulting service provider that provides consulting services to clients;
(B) determining that the first account belongs to a first client of said consulting service provider;
(C) determining that the second account belongs to a second client of said consulting service provider;
(D) based on the determining operations of steps (A) and (B) and (C), determining that said single user is a legitimate human user that is genuinely associated with each one of said first account and second account.

23. The method of claim 1, wherein the determining of step (c) comprises:
(A) determining that the first account-owner is a legal custodian of the second account-owner;
(B) based on the determining of step (A), determining that said single user is a legitimate human user that is genuinely associated with each one of said first account and second account.

24. The method of claim 1, wherein the determining of step (c) comprises:
(A) determining that there exists a trustee-and-beneficiary relationship between the first account-owner and the second account-owner;
(B) based on the determining of step (A), determining that said single user is a legitimate human user that is genuinely associated with each one of said first account and second account.

25. The method of claim 1, wherein the determining of step (c) comprises:
(A) determining that the first account and the second account are currently non-linked to each other; and further determining that the first account and the second account used to be linked to each other at a past time-point;
(B) based on the determining of step (A), determining that said single user is a legitimate human user that is genuinely associated with each one of said first account and second account.

26. The method of claim 1, comprising:
(A) monitoring operations that said single user performs as logged-in user in said first account;
(B) determining a first pattern of operations that said single user performed as logged-in user in said first account;
(C) monitoring operations that said single user performs as logged-in user in said second account;
(D) determining a second pattern of operations that said single user performed as logged-in user in said second account;
(E) determining that the first pattern of operations is identical to the second pattern of operations;
(F) based on the determining of step (E), determining that said single user is a cyber-attacker attempting to attack said first account and said second account.

27. The method of claim 1, comprising:
(A) monitoring operations that said single user performs as logged-in user in said first account;
(B) determining a first pattern of operations that said single user performed as logged-in user in said first account;
(C) monitoring operations that said single user performs as logged-in user in said second account;
(D) determining a second pattern of operations that said single user performed as logged-in user in said second account;
(E) determining that the first pattern of operations is similar, beyond a pre-defined level of similarity, to the second pattern of operations;
(F) based on the determining of step (E), determining that said single user is a cyber-attacker attempting to attack said first account and said second account.

28. The method of claim 1, comprising:
(A) monitoring operations that said single user performs as logged-in user in said first account;
(B) determining a first pattern of operations that said single user performed as logged-in user in said first account;
(C) monitoring operations that said single user performs as logged-in user in said second account;
(D) determining a second pattern of operations that said single user performed as logged-in user in said second account;
(E) determining that the first pattern of operations is identical to the second pattern of operations, and further determining that the first account is not related to the second account;
(F) based on the determining operations of step (E), determining that said single user is a cyber-attacker attempting to attack said first account and said second account.

29. The method of claim 1, comprising:
(A) monitoring operations that said single user performs as logged-in user in said first account;
(B) determining a first pattern of operations that said single user performed as logged-in user in said first account;
(C) monitoring operations that said single user performs as logged-in user in said second account;

(D) determining a second pattern of operations that said single user performed as logged-in user in said second account;
(E) determining that the first pattern of operations is similar, beyond a pre-defined level of similarity, to the second pattern of operations, and further determining that the first account is not related to the second account;
(F) based on the determining operations of step (E), determining that said single user is a cyber-attacker attempting to attack said first account and said second account.

30. The method of claim 1, comprising:
(A) monitoring operations that said single user performs as logged-in user in said first account;
(B) determining a first pattern of operations that said single user performed as logged-in user in said first account;
(C) monitoring operations that said single user performs as logged-in user in said second account;
(D) determining a second pattern of operations that said single user performed as logged-in user in said second account;
(E) determining that the first pattern of operations is identical to the second pattern of operations, and further determining that the first pattern of operations is abnormal relative to a general distribution of operation patterns of a general group of users of said computerized service;
(F) based on the determining of step (E), determining that said single user is a cyber-attacker attempting to attack said first account and said second account.

31. The method of claim 1, comprising:
(A) monitoring operations that said single user performs as logged-in user in said first account;
(B) determining a first pattern of operations that said single user performed as logged-in user in said first account;
(C) monitoring operations that said single user performs as logged-in user in said second account;
(D) determining a second pattern of operations that said single user performed as logged-in user in said second account;
(E) determining that the first pattern of operations is similar, beyond a pre-defined level of similarity, to the second pattern of operations, and further that the first pattern of operations is abnormal relative to a general distribution of operation patterns of a general group of users of said computerized service;
(F) based on the determining of step (E), determining that said single user is a cyber-attacker attempting to attack said first account and said second account.

32. The method of claim 1, comprising:
(A) monitoring operations that said single user performs as logged-in user in said first account;
(B) determining a first pattern of operations that said single user performed as logged-in user in said first account;
(C) monitoring operations that said single user performs as logged-in user in said second account;
(D) determining a second pattern of operations that said single user performed as logged-in user in said second account;
(E) determining that the first pattern of operations is identical to the second pattern of operations, and further determining that the first account is non-related to the second account, and further determining that the first pattern of operations is abnormal relative to a general distribution of operation patterns of a general group of users of said computerized service;
(F) based on the determining of step (E), determining that said single user is a cyber-attacker attempting to attack said first account and said second account.

33. The method of claim 1, comprising:
(A) monitoring operations that said single user performs as logged-in user in said first account; and determining a first pattern of operations that said single user performed as logged-in user in said first account;
(B) monitoring operations that said single user performs as logged-in user in said second account; and determining a second pattern of operations that said single user performed as logged-in user in said second account;
(C) determining that the first pattern of operations is similar, beyond a pre-defined level of similarity, to the second pattern of operations, and further determining that the first account is non-related to the second account, and further that the first pattern of operations is abnormal relative to a general distribution of operation patterns of a general group of users of said computerized service;
(D) based on the determining of step (C), determining that said single user is a cyber-attacker attempting to attack said first account and said second account.

* * * * *